United States Patent [19]

Kamiya et al.

[11] Patent Number: 5,354,811

[45] Date of Patent: Oct. 11, 1994

[54] FLUORINE-CONTAINING THERMOPLASTIC ELASTOMER COMPOSITION AND PROCESS FOR ITS PRODUCTION

[75] Inventors: Hiroki Kamiya; Masayuki Saito, both of Kawasaki, Japan

[73] Assignee: Asahi Glass Company Ltd., Tokyo, Japan

[21] Appl. No.: 978,501

[22] Filed: Nov. 18, 1992

[30] Foreign Application Priority Data

Nov. 20, 1991 [JP] Japan ................... 3-331366

[51] Int. Cl.$^5$ ............................................. C08L 27/12
[52] U.S. Cl. ...................................... 525/200; 525/199; 525/523; 528/88; 528/211; 528/373; 528/401; 576/255; 576/243
[58] Field of Search ................. 525/199, 200, 523; 528/401, 88, 271, 373; 526/255, 243

[56] References Cited

U.S. PATENT DOCUMENTS

| | | | |
|---|---|---|---|
| 3,132,121 | 5/1964 | Pascal | 526/255 |
| 3,445,434 | 5/1969 | Stilmar | 526/255 |
| 3,467,635 | 9/1969 | Brasen et al. | 526/216 |
| 3,893,641 | 7/1975 | Tabata et al. | 526/255 |
| 3,933,773 | 1/1976 | Foerster | 526/255 |
| 4,454,249 | 6/1984 | Suzuki et al. | 525/200 |
| 4,555,543 | 11/1985 | Effenberger et al. | 525/200 |
| 4,587,286 | 5/1986 | Wilkinson | 524/544 |
| 4,713,418 | 12/1987 | Logothetis | 525/200 |
| 4,914,146 | 4/1990 | Honda et al. | 526/255 |
| 4,914,158 | 4/1990 | Yoshimura et al. | 525/200 |
| 4,952,630 | 8/1990 | Morgan et al. | 525/200 |
| 5,006,594 | 4/1991 | Rees | 525/200 |
| 5,059,480 | 10/1991 | Guerra et al. | 525/200 |

OTHER PUBLICATIONS

Patent Abstracts of Japan, vol. 12 (C-517), Aug. 1, 1988, JP-A-63 057 659, Mar. 12, 1988, S. Kazuhisa, et al., "Shim for Brake Pad".

*Primary Examiner*—Melvyn I. Marquis
*Assistant Examiner*—Randy Gulakowski
*Attorney, Agent, or Firm*—Oblon, Spivak, McClelland, Maier & Neustadt

[57] ABSTRACT

A fluorine-containing thermoplastic elastomer composition comprising a continuous phase of at least one melt-formable thermoplastic fluorocarbon resin and a disperse phase of vulcanizate of a fluorine-containing elastomer having vulcanizable sites selected from the group consisting of epoxy groups, carboxylic acid groups, carboxylic acid derivative groups, sulfonic acid groups and sulfonic acid derivative groups, wherein the disperse phase is from 50 to 90% by weight based on the total amount of the continuous phase and the disperse phase.

8 Claims, No Drawings

FLUORINE-CONTAINING THERMOPLASTIC ELASTOMER COMPOSITION AND PROCESS FOR ITS PRODUCTION

FIELD OF THE INVENTION

The present invention relates to a fluorine-containing thermoplastic elastomer composition comprising a continuous thermoplastic fluorocarbon resin phase and a dispersed amorphous vulcanized fluorine-containing elastomer phase, which is useful as a melt-formable material having rubber elasticity. Further, it relates to a process for producing a fluorine-containing thermoplastic elastomer composition, which comprises melt-blending the above-mentioned thermoplastic fluorocarbon resin and the non-vulcanized amorphous fluorine-containing elastomer, followed by dynamically vulcanizing this blend to form elastomer particles dispersed in the thermoplastic fluorocarbon resin.

BACKGROUND OF THE INVENTION

A two-phase composition comprising a continuous phase thermoplastic material and a disperse phase elastomer, produced by dynamically vulcanizing the elastomer while the disperse phase elastomer is dispersed in the continuous phase thermoplastic material, is disclosed and known, for example, in Coran et al. U.S. Pat. Nos. 4,348,502, 4,130,535, 4,173,556, 4,207,404 and 4,409,365.

A fluorocarbon resin or a fluorine-containing elastomer is excellent in the heat resistance, and a two-phase blend obtainable by a combination of these materials, is expected to be excellent in the heat resistance. Such a fluorine-containing two-phase blend is disclosed in EP168020A. The elastomer used here is substantially a vinylidene fluoride/hexafluoropropylene elastomer, and as its vulcanization method, polyol vulcanization by a combination of bisphenol AF, an acid-receiving agent and an onium salt, or peroxide vulcanization by a combination of an organic peroxide and a polyfunctional unsaturated compound, is employed.

However, by such a vulcanization system, it takes a long time to completely vulcanize the fluorine-containing elastomer, and it is necessary to conduct oven vulcanization after the dynamic vulcanization, and there has been a problem that by the dynamic vulcanization only, the mechanical properties tend to be inadequate, particularly the permanent strain tends to be substantial, due to inadequate vulcanization of the elastomer in the composition.

SUMMARY OF THE INVENTION

The present invention has been made under these circumstances, and it is an object of the present invention to solve such problems and to provide a two-phase composition comprising fluorinated polymers, which is useful as a thermoplastic elastomer excellent in the heat resistance and having adequate mechanical properties, and a process for its production.

The present inventors have conducted extensive studies to solve the above problems and as a result, have found that the desired two-phase composition can be obtained by using as the fluoroelastomer an amorphous fluorine-containing elastomer having vulcanizable sites selected from the group consisting of epoxy groups, carboxylic acid groups, carboxylic acid derivative groups, sulfonic acid groups and sulfonic acid derivative groups. The present invention has been accomplished on the basis of this discovery.

DETAILED DESCRIPTION OF THE INVENTION

Thus, the present invention provides a fluorine-containing thermoplastic elastomer composition comprising a continuous phase of at least one melt-formable thermoplastic fluorocarbon resin and a disperse phase of vulcanizate of a fluorine-containing elastomer having vulcanizable sites selected from the group consisting of epoxy groups, carboxylic acid groups, carboxylic acid derivative groups, sulfonic acid groups and sulfonic acid derivative groups, wherein the disperse phase is from 50 to 90% by weight based on the total amount of the continuous phase and the disperse phase.

Further, the present invention provides a process for producing a fluorine-containing thermoplastic elastomer composition, which comprises a step of melt-blending at least one melt-formable thermoplastic fluorocarbon resin and a fluorine-containing elastomer having vulcanizable sites selected from the group consisting of epoxy groups, carboxylic acid groups, carboxylic acid derivative groups, sulfonic acid groups and sulfonic acid derivative groups, and a step of vulcanizing the fluorine-containing elastomer while exerting a mixing shear force at a temperature higher than the melting point of the thermoplastic fluorocarbon resin.

Now, the present invention will be described in detail with reference to the preferred embodiments.

The fluorocarbon resin useful for the present invention is required to have thermoplasticity i.e. it is required to be melt-formable. Namely, it must be a resin whereby the melt flow or the volume flow rate described in ASPM D-2116 can be measured at a temperature higher than the melting point. It is preferably a thermoplastic fluorocarbon resin which can be melt-formed at a temperature at which there is no problem of deterioration of the fluorine-containing elastomer. Among usual thermoplastic fluorocarbon resins, all fluorocarbon resins except for polytetrafluoroethylene resins which can not be melt-formed, may be employed.

The thermoplastic fluorocarbon resin useful for the present invention is a thermoplastic fluorocarbon resin having a fluorine content of at least 35% by weight, which can be obtained by polymerizing an ethylenically unsaturated compound containing a completely or partially fluorinated fluoroolefin, preferably at least one fluoroolefin selected from the group consisting of tetrafluoroethylene, hexafluoropropylene, trifluoroethylene, vinylidene fluoride, vinyl fluoride, trifluoroethylene chloride and a perfluoroalkylvinyl ether (wherein the alkyl group has from 1 to 8 carbon atoms).

The ethylenically unsaturated compound may, for example, be a non-fluorinated olefin such as ethylene or propylene, an alkylvinyl ether or a perfluoroalkyl ethylene, in addition to the above fluoroolefins.

Preferred among such polymers is a tetrafluoroethylene/ethylene copolymer, a tetrafluoroethylene/hexafluoropropylene copolymer, a tetrafluoroethylene/perfluoropropylvinyl ether copolymer, a trifluoroethylene chloride/ethylene copolymer or a vinylidene fluoride polymer. Particularly preferred is a tetrafluoroethylene/ethylene copolymer. A plurality of fluorocarbon resins may be used in combination. These copolymers may have other copolymerizable components further copolymerized. Preferred is a copolymer which has a molar ratio of tetrafluoroethylene/e- thylene/copolymerizable unsaturated compound being from 30-70/30-70/0-10.

The fluorocarbon resin is suitably selected also for the combination with the fluorine-containing elastomer which will be described hereinafter. For example, when the fluorocarbon resin or the fluorine-containing elastomer is a polymer having vinylidene fluoride units, a polarity will be formed. Accordingly, as a combination of the fluorocarbon resin and the fluorine-containing elastomer, it is advisable to select a combination of the resin and the elastomer both having vinylidene fluoride units or both having no vinylidene fluoride units to obtain a composition having uniform and excellent physical properties.

The elastomer to be used in the present invention is a fluorine-containing elastomer having vulcanizable sites selected from the group consisting of epoxy groups, carboxylic acid groups, carboxylic acid derivative groups, sulfonic acid groups and sulfonic acid derivative groups. Such an elastomer can be obtained by co-polymerizing an ethylenically unsaturated compound having at least one of the above-mentioned functional groups at the time of synthesizing the fluorine-containing elastomer as described hereinafter. Here, the carboxylic acid derivative groups and the sulfonic acid groups are groups derived from carboxylic acid groups and sulfonic acid groups, respectively. They may be acid halide groups such as carboxylic acid chlorides or sulfonic acid fluorides, alkyl ester groups, or groups in the form of salts such as ammonium salts.

The ethylenically unsaturated compound having such a functional group may, for example, be a vinyl ether having an epoxy group, as shown by the following formula (1), a vinyl fluoride ether having a carboxylic acid derivative group, as shown by the following formula (2), or a vinyl fluoride ether having a sulfonic acid derivative group, as shown by the following formula (3).

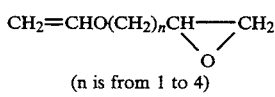

(n is from 1 to 4)

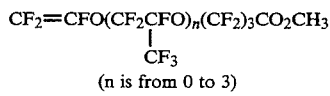

(n is from 0 to 3)

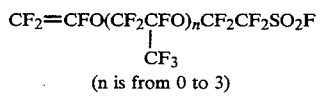

(n is from 0 to 3)

The fluorine-containing elastomer is prepared by polymerizing an ethylenically unsaturated compound containing at least one fluoroolefin selected from the group consisting of tetrafluoroethylene, hexafluoropropylene, trifluoroethylene, vinylidene fluoride, vinyl fluoride, trifluoroethylene chloride and a perfluoroalkylvinyl ether (wherein the alkyl group has from 1 to 12 carbon atoms). The ethylenically unsaturated compound may, for example, be a non-fluorinated olefin such as ethylene or propylene, an alkylvinyl ether or a perfluoroalkyl ethylene, in addition to the above-mentioned fluoroolefins.

Such a fluorine-containing elastomer is preferably a vinylidene fluoride/hexafluoropropylene copolymer, a tetrafluoroethylene/propylene copolymer, a tetrafluoroethylene/perfluoroalkylvinyl ether copolymer, a vinylidene fluoride/perfluoroalkylvinyl ether copolymer or a vinylidene fluoride/tetrafluoroethylene/hexafluoropropylene copolymer.

These copolymers may have other copolymerizable components further copolymerized. It is preferred to employ a copolymer having a molar ratio of tetrafluoroethylene/propylene/copolymerizable unsaturated compound being 30-80/20-55/0-40. The fluorine content of such an elastomer is usually from 50 to 65%.

The elastomer to be used in the present invention has vulcanizable sites selected from the group consisting of epoxy groups, carboxylic acid groups, carboxylic acid derivative groups, sulfonic acid groups and sulfonic acid derivative groups, and therefore vulcanization can readily proceed in a short period of time by utilizing such an elastomer.

For example, in the case of an elastomer having epoxy groups as vulcanizable sites, vulcanization proceeds by an addition of ammonium benzoate. Further, in a case of an elastomer having carboxylic acid groups, carboxylic acid derivative groups, sulfonic acid groups or sulfonic acid derivative groups as vulcanizable sites, vulcanization can be conducted by means of a polyfunctional epoxy compound, a polyfunctional amine compound or a metal oxide.

The composition of the present invention contains the vulcanized elastomer component in an amount of from 50 to 90% by weight based on the total amount of the thermoplastic fluorocarbon resin and the vulcanized elastomer. If the vulcanized elastomer exceeds 90% by weight, the phase structure with the thermoplastic fluorocarbon resin tends to be irregular, whereby adequate formability as a composition tends to be hardly maintained. If the vulcanized elastomer is less than 50% by weight, creeping tends to take place, such being undesirable as rubber. The composition preferably contains from 55 to 80% by weight of the vulcanized elastomer component.

The composition of the present invention may contain a filler, an antioxidant, a stabilizer, a pigment, a processing assistant, etc. in an amount at a level of common use.

The particle size of the disperse phase of the present invention varies depending upon the components of the composition, the proportions of the respective components, the viscosities of the respective components, the production conditions, etc. However, the average particle size is usually preferably not larger than 5 μm, more preferably not larger than 3 μm.

The process of the present invention comprises melt-blending the thermoplastic fluorocarbon resin and the fluorine-containing elastomer at a temperature higher than the melting point of the fluorocarbon resin in an extruder or in a mixer, followed by vulcanizing the fluorine-containing elastomer while exerting a mixing shearing force.

The temperature for the above melt-blending is usually at least 200° C., preferably at least 250° C. If the temperature is too low, the thermoplastic fluorocarbon resin will not melt or, if melt, will have a high viscosity, whereby blending will be difficult. On the other hand, if the temperature is too high, the thermoplastic fluorocarbon resin or the fluorine-containing elastomer will be decomposed, whereby a gas or the like will be generated, or the mechanical strength tends to deteriorate. The temperature may be suitably selected depending upon the types of the thermoplastic fluorocarbon resin and the fluorine-containing elastomer to be used.

The vulcanization process can be conducted by adding at least one member selected from the group consisting of vulcanizing agents and vulcanization accelerators. The addition of the vulcanizing agent or the vulcanization accelerator is preferably conducted after melt-blending the thermoplastic fluorocarbon resin and the fluorine-containing elastomer. If it is added before the melt-blending, vulcanization will proceed during the blending, whereby it tends to be difficult to obtain a uniform composition. Further, to accelerate the vulcanization reaction, the temperature may be raised after adding the vulcanizing agent or the vulcanization accelerator.

It is necessary to conduct the vulcanization while exerting a mixing shearing force. As the vulcanization is conducted while a mixing shearing force is applied, the thermoplastic fluorocarbon resin will form a continuous phase, and a disperse phase having vulcanizate of a fluorine-containing elastomer uniformly dispersed in the continuous phase, will be formed. Such a continuous phase will be formed even when the thermoplastic fluororesin is in a small amount. If the disperse phase is not uniformly dispersed, the rubbery nature can not adequately be obtained. Further, if the continuous phase and the disperse phase are reversed, the properties as a thermoplastic rubber can not be attained.

The present invention provides a two-phase composition comprising a continuous phase thermoplastic material and a disperse phase elastomer, produced by dynamically vulcanizing the elastomer while the disperse phase elastomer is dispersed in the continuous phase thermoplastic material, wherein a fluorocarbon resin is used as the thermoplastic material and a fluorine-containing elastomer having vulcanizable sites selected from the group consisting of epoxy groups, carboxylic acid groups, carboxylic acid derivative groups, sulfonic acid groups and sulfonic acid derivative groups, is used as the elastomer, to present a composition useful as a thermoplastic elastomer excellent in the moldability and mechanical properties, and the present invention also provides a process for its production.

DESCRIPTION OF THE PREFERRED EMBODIMENTS

Now, the present invention will be described with reference to Examples. However, it should be understood that the present invention is by no means restricted by such specific Examples.

EXAMPLES 1 TO 7

An elastomer having epoxy groups of a tetrafluoroethylene/propylene type having 2.3 mol % of glycidyl vinyl ether copolymerized and a fluorocarbon resin were kneaded at 250° C. (300° C. in Example 2) for five minutes at a rotor speed of 100 rpm by a Laboplastomill (manufactured by Toyo Seiki). Then, ammonium benzoate was added thereto as a vulcanizing agent, and the mixture was kneaded for 20 minutes under the same condition as the initial kneading to obtain a composition. With respect to this composition, the tensile strength and elongation at break (TB/EB), the modulus (M100), the hardness (JIS A), the tension set (T set) and the volume flow rate (as measured by a down flow tester, manufactured by Shimadzu Corporation).

The respective compositions and the physical properties are shown in Table 1.

COMPARATIVE EXAMPLE 1

A composition was prepared in the same manner as in Examples 1 to 7 except that a tetrafluoroethylene/propylene copolymer containing no epoxy group was used. In this case, it was impossible to obtain a product having adequate tensile strength and elongation. The composition and the physical properties are shown in Table 1.

COMPARATIVE EXAMPLES 2 TO 4

A composition was prepared in the same manner as in Examples 1 to 7 except that a tetrafluoroethylene/propylene polymer containing no epoxy group was used, and as vulcanizing agent, triarylisocyanurate (TAIC) and as the peroxide, perbutyl P (manufactured by Nippon Oil and Fats) were used (the temperature for the initial and subsequent kneading operations was 300° C. in Comparative Example 2 and 250° C. in other Comparative Examples). In this case, the tension set was larger than the one vulcanized by means of epoxy groups, such being undesirable. Further, the volume flow rate was small, and the moldability was poor.

The respective compositions and the physical properties are shown in Table 1.

TABLE 1

|  | Example 1 | Example 2 | Example 3 | Example 4 | Example 5 | Example 6 | Example 7 |
| --- | --- | --- | --- | --- | --- | --- | --- |
| Elastomer 1 | 100 | 100 | 100 | 100 | 100 | 100 | 100 |
| Elastomer 2 |  |  |  |  |  |  |  |
| Resin 1 | 52 |  |  |  |  |  |  |
| Resin 2 |  | 52 |  |  |  |  |  |
| Resin 3 |  |  | 52 | 52 |  |  | 43.5 |
| Resin 4 |  |  |  |  | 52 |  |  |
| Resin 5 |  |  |  |  |  | 35 | 8.5 |
| Vulcanizing agent | 2.2 | 4.3 | 4.3 | 4.3 | 4.3 | 4.3 | 4.3 |
| MT carbon |  |  |  | 10 |  |  |  |
| TAIC |  |  |  |  |  |  |  |
| Perbutyl P |  |  |  |  |  |  |  |
| TB/EB (kg/cm$^2$ %) | 185/364 | 226/404 | 141/162 | 162/272 | 210/299 | 115/198 | 126/351 |
| M100 (kg/cm$^2$) | 57 | 83 | 34 | 42 | 82.5 | 48.8 | 39.7 |
| Hardness (JIS A) | 82 | 88 | 74 | 80 | 85 | 74 | 77 |
| T set 100% | 40 | 60 | 55 | 60 | 50 | 25 | 30 |
| Volume flow rate | 5.2 | 3.4 | 11.0 | 9.2 | 16.7 | 1.7 | 7.1 |

TABLE 1-continued

| | Example 1 | Example 2 | Example 3 | Example 4 | Example 5 | Example 6 | Example 7 |
|---|---|---|---|---|---|---|---|
| (mm³/sec) | | | | | | | |

| | Comparative Example 1 | Comparative Example 2 | Comparative Example 3 | Comparative Example 4 |
|---|---|---|---|---|
| Elastomer 1 | | | | |
| Elastomer 2 | 100 | 100 | 100 | 100 |
| Resin 1 | 52 | 52 | | |
| Resin 2 | | | 52 | |
| Resin 3 | | | | 52 |
| Resin 4 | | | | |
| Resin 5 | | | | |
| Vulcanizing agent | 4.3 | | | |
| MT carbon | | | | |
| TAIC | | 3.0 | 3.0 | 3.0 |
| Perbutyl P | | 0.8 | 0.8 | 0.8 |
| TB/EB (kg/cm² %) | 37/207 | 138/364 | 149/386 | 120/159 |
| M100 (kg/cm²) | Not measurable | 46.8 | 53.1 | 32.0 |
| Hardness (JIS A) | 68 | 72 | 74 | 70 |
| T set 100% | Not measurable | 90 | 85 | 90 |
| Volume flow rate (mm³/sec) | 70 | 1.8 | 1.8 | 2.0 |

The blend components and the measuring conditions in Table 1 are as follows.

Elastomer 1: Copolymer of tetrafluoroethylene/-propylene/glycidylvinyl ether=56/42/2 mol %
Elastomer 2: Two-component copolymer of tetrafluoroethylene/propylene (Aflus 150 E, manufactured by Asahi Glass Company Ltd.)
Resin 1: Three-component copolymer of tetrafluoroethylene/ethylene/perfluorobutylethylene, melting point: 230° C.
Resin 2: Three-component copolymer of tetrafluoroethylene/ethylene/perfluorobutylethylene, melting point: 260° C.
Resin 3: Three-component copolymer of tetrafluoroethylene/ethylene/chlorotrifluoroethylene, melting point: 200° C.
Resin 4: Two-component copolymer of ethylene/-chlorotrifluoroethylene, melting point: 230° C.
Resin 5: Chlorotrifluoroethylene polymer, melting point: 210° C.
Vulcanizing agent: Ammonium benzoate Volume flow rate: Measured at a temperature of 300° C. under a load of 30 kg by means of a die of 2.095φ×8 mm

Evaluation of heat stability

The compositions obtained in Examples 1 to 3 and compositions obtained in Comparative Examples 2 to 4 were heat-treated at a temperature of 180° C. for 15 hours, whereupon the volume flow rates were measured. The volume flow rates before and after the heat treatment are shown in Table 2. In Comparative Examples, the decrease in the volume flow rate is substantially large as compared with the Examples, and no substantial thermoplasticity was shown, thus indicating poor heat stability.

TABLE 2

| Volume flow rate (mm³/sec) | Composition | | | | | |
|---|---|---|---|---|---|---|
| | Example 1 | Example 2 | Example 3 | Comparative Example 2 | Comparative Example 3 | Comparative Example 4 |
| Before heat treatment | 5.2 | 3.4 | 11.0 | 18.2 | 17.6 | 19.6 |
| After heat treatment | 4.7 | 2.1 | 9.9 | <0.1 | <0.1 | <0.1 |

EXAMPLE 8

A composition was prepared at 300° C. in the same manner as in Example 1 except that a tetrafluoroethylene/hexafluoropropylene copolymer (FEP) having a melting point of 267° C. was used as a fluorocarbon resin, an elastomer having 3 mol % of a compound having sulfonyl groups represented by the formula

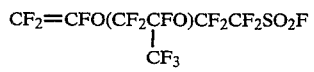

$$CF_2=CFO(CF_2CFO)CF_2CF_2SO_2F$$
$$|$$
$$CF_3$$

copolymerized to vinylidene fluoride/hexafluoropropylene, was used as a fluorine-containing elastomer, and hexamethylenediamine was used as a vulcanizing agent.
TB=328 kg/cm², EB=189%, hardness=75, T set=40%
(100% elongation), volume flow rate=1.08 mm³/sec
The composition of the present invention has the nature of fluororubber and is moldable like a thermoplastic resin. Further, even after the heat treatment, it has excellent melt flowability and thus can be used repeatedly.

We claim:
1. A fluorine-containing thermoplastic elastomer composition comprising a continuous phase of at least one melt-formable thermoplastic fluorocarbon resin (A) and a disperse phase of vulcanizate of a fluorine-containing elastomer (B) having vulcanizable sites selected from the group consisting of epoxy groups, carboxylic acid groups, carboxylic acid halide groups, carboxylic acid alkyl ester groups, carboxylic acid ammonium salt groups, sulfonic acid groups, sulfonic acid halide groups, sulfonic acid alkyl ester groups and sulfonic acid ammonium salt groups, wherein the disperse phase is from 50 to 90% by weight based on the total amount of the continuous phase and the disperse phase.

2. The composition according to claim 1, wherein the fluorine-containing elastomer (B) is a tetrafluoroethylene/propylene elastomer.

3. The composition according to claim 1, wherein the thermoplastic fluorocarbon resin (A) is a tetrafluoroethylene/ethylene copolymer.

4. The composition according to claim 1, wherein the vulcanizable sites are epoxy groups.

5. The composition according to claim 1, wherein the vulcanizable sites are carboxylic acid alkyl ester groups.

6. A process for producing a fluorine-containing thermoplastic elastomer composition, which comprises a step of melt-blending at least one melt-formable thermoplastic fluorocarbon resin (A) and a fluorine-containing elastomer (B) having vulcanizable sites selected from the group consisting of epoxy groups, carboxylic acid groups, carboxylic acid halide groups, carboxylic acid alkyl ester groups, carboxylic acid ammonium salt groups, sulfonic acid groups, sulfonic acid halide groups, sulfonic acid alkyl ester groups and sulfonic acid ammonium salt groups, and a step of vulcanizing the fluorine-containing elastomer while exerting a mixing shear force at a temperature higher than the melting point of the thermoplastic fluorocarbon resin.

7. The process according to claim 6, wherein at least one member selected from the group consisting of vulcanizing agents and vulcanization accelerators is added after the melt-blending step and before the vulcanizing step.

8. The process according to claim 6, wherein the melt-blending is conducted at a temperature of at least 200° C.

* * * * *